United States Patent
Huang

(10) Patent No.: US 6,430,973 B1
(45) Date of Patent: Aug. 13, 2002

(54) STEEL CABLE LOCK STRUCTURE

(76) Inventor: Wen-Sheng Huang, No. 33, Chiu-Mao Rd., Tunghsiao Town, Miaoli County (TW)

(*) Notice: Subject to any disclaimer, the term of this patent is extended or adjusted under 35 U.S.C. 154(b) by 0 days.

(21) Appl. No.: 09/651,587

(22) Filed: Aug. 30, 2000

(51) Int. Cl.$^7$ .............................................. E05B 73/00
(52) U.S. Cl. ...................... 70/18; 70/49; 70/58; 70/233
(58) Field of Search ............................. 70/18, 49, 53, 70/58, 30, 233

(56) References Cited

U.S. PATENT DOCUMENTS

| | | | | |
|---|---|---|---|---|
| 3,838,585 | A | * 10/1974 | Foote | 70/18 |
| 4,302,954 | A | * 12/1981 | Zisterer | 70/18 |
| 4,570,465 | A | * 2/1986 | Bennett | 70/18 |
| 4,850,207 | A | * 7/1989 | Ylven | 70/49 |
| 5,119,649 | A | * 6/1992 | Spence | 70/14 |
| 5,398,530 | A | * 3/1995 | Derman | 70/18 X |
| 6,006,555 | A | * 12/1999 | Shu-Fen | 70/18 |
| 6,026,662 | A | * 2/2000 | Schlipper | 70/18 |
| 6,032,498 | A | * 3/2000 | Sherlock et al. | 70/58 |
| 6,109,074 | A | * 8/2000 | Du | 70/18 |
| 6,155,088 | A | * 12/2000 | Murray, Jr et al. | 70/57 X |
| 6,167,734 | B1 | * 1/2001 | Derman | 70/18 |

FOREIGN PATENT DOCUMENTS

| NL | 7806670 | * 12/1979 | 70/18 |
|---|---|---|---|
| GB | 213 | * 1/1879 | 70/49 |

* cited by examiner

Primary Examiner—Lloyd A. Gall
(74) Attorney, Agent, or Firm—Troxell Law Office PLLC

(57) ABSTRACT

A steel cable lock including a steel cable, a lock body fixed at one end of the steel cable, a lock pin member and a fitting ring formed at the other end of the steel cable. A movable sleeve member is fitted on the steel cable with a subsidiary steel cable extending from the sleeve member. The lock pin member is disposed at a free end of the subsidiary steel cable. When used, the lock body at one end of the steel cable and the subsidiary steel cable as well as the lock pin member are first passed through the fitting ring at the other end of the steel cable to wind the steel cable around a fixed article and fix the end of the steel cable with the fitting ring on the fixed article such as a pole or a rail. Then the end of the steel cable with the lock body, the subsidiary steel cable and the pin lock member are wound around the article to be locked and then the lock pin member is plugged into the lock body to achieve a locking effect.

1 Claim, 3 Drawing Sheets

STEEL CABLE LOCK STRUCTURE

BACKGROUND OF THE INVENTION

The present invention relates to an improved steel cable lock structure including a steel cable, a lock body fixed at one end of the steel cable and a fitting ring formed at the other end thereof. A subsidiary steel cable is movably fitted on the steel cable and a lock pin member is disposed at a free end of the subsidiary steel cable. By means of the structure, it is unnecessary to wind the steel cable around the articles by several loops so that the winding length of the steel cable is shortened. In addition, the steel cable can be pulled and passed through multiple articles to serially lock multiple articles together. Moreover, as necessary, the steel cable lock is able to lock an article spaced from the fixed article by a longer distance.

A conventional steel cable lock has a lock body at one end of a steel cable and a lock pin at the other end of the steel cable for plugging into the lock body so as to lock a motorcycle or a bicycle. When locking a movable article with a fixed article, the steel cable is wound around the article to be locked and the fixed article by several loops and then the lock pin is plugged into the lock body to achieve a locking effect. However, the several loops of steel cable can only achieve the same locking effect as one single loop of steel cable. Therefore, some of the length of the steel cable is wasted. On the other hand, in the case that the article to be locked has large size or is spaced from the fixed article by a longer distance, the steel cable often has insufficient length for locking the article.

SUMMARY OF THE INVENTION

It is therefore a primary object of the present invention to provide an improved steel cable lock structure which shortens the winding length of the steel cable and is able to serially lock multiple articles together. Moreover, as necessary, the steel cable lock is able to lock an article spaced from the fixed article by a longer distance.

The present invention can be best understood through the following description and accompanying drawings wherein:

DETAILED DESCRIPTION OF THE PREFERRED EMBODIMENTS

Figure 1:
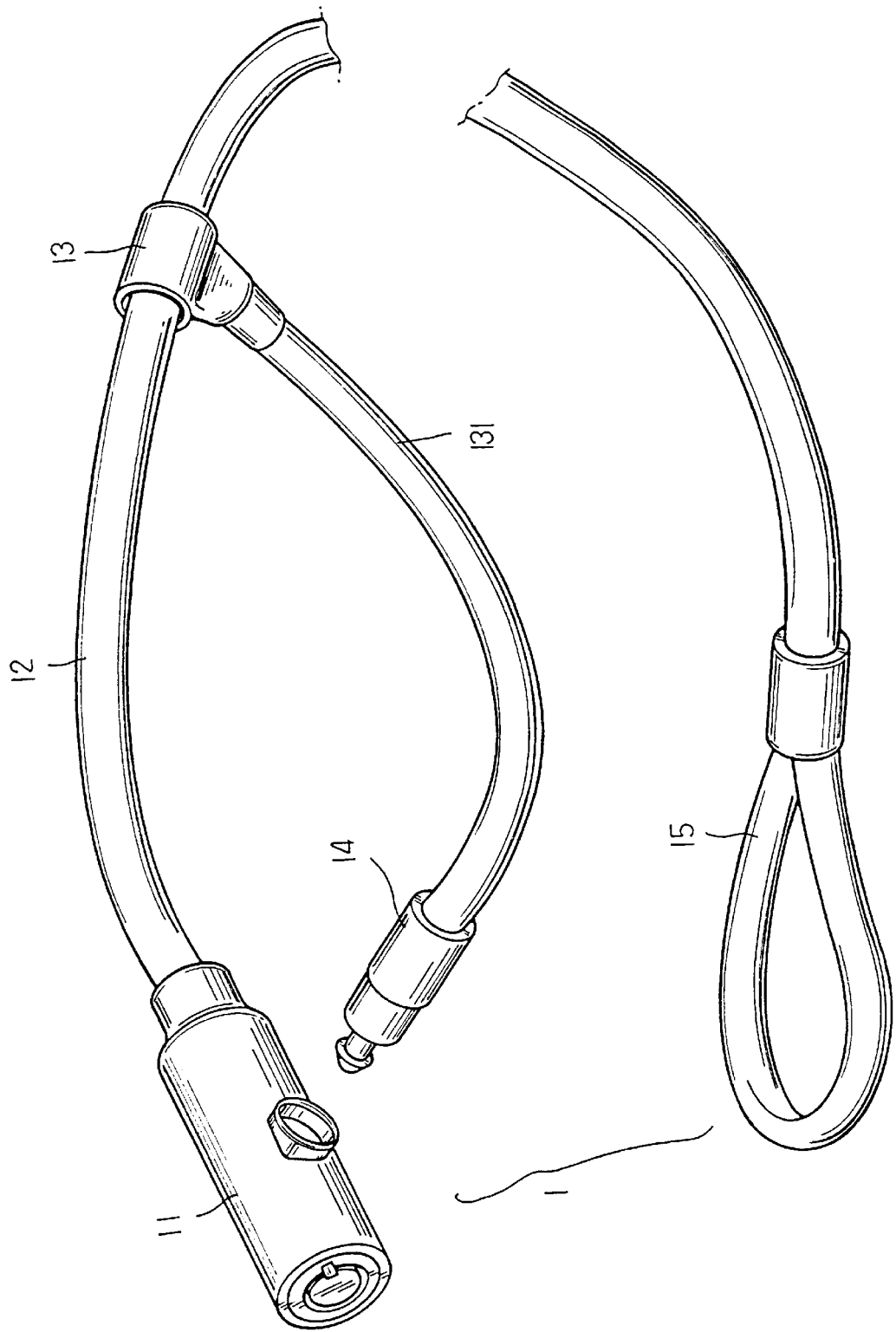
FIG. 1 is a perspective view of the steel cable lock structure of the present invention.
Figure 2:
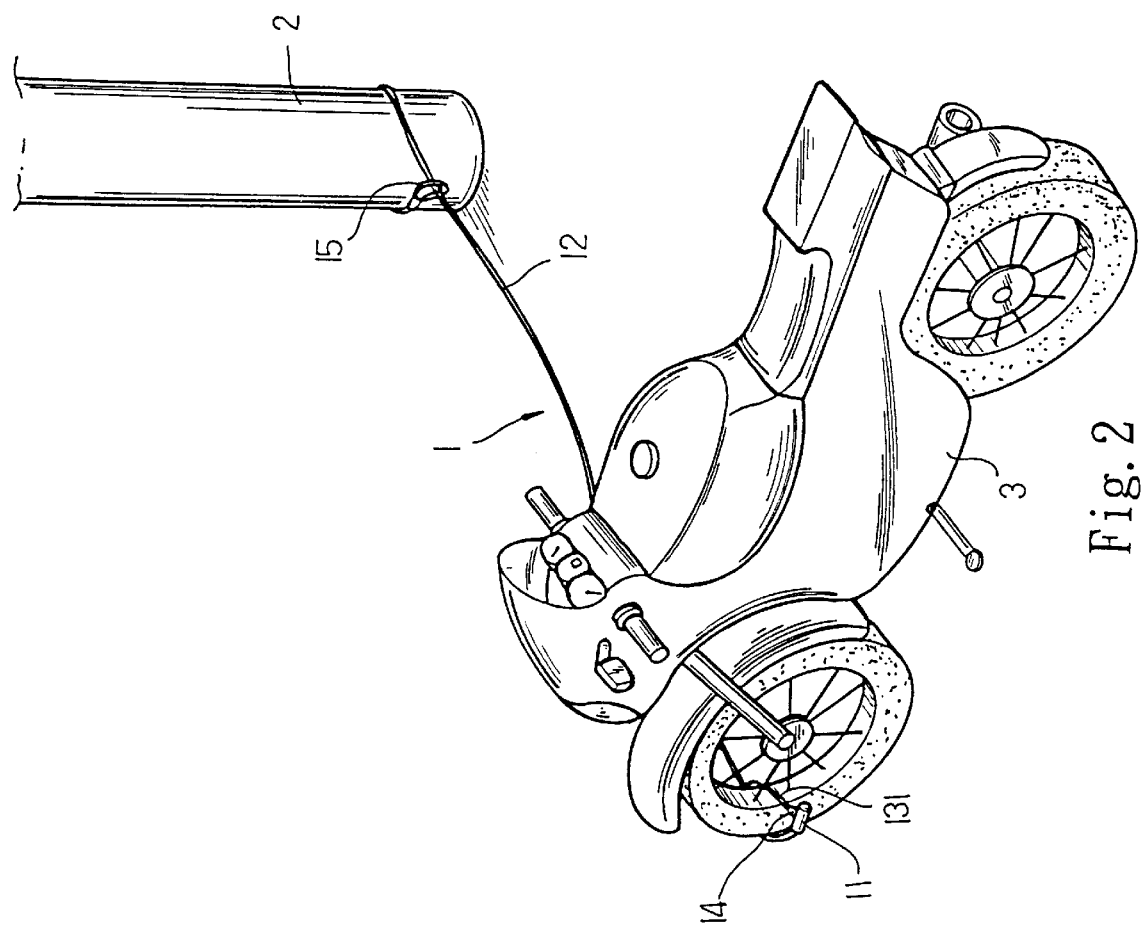
FIG. 2 shows an application of the steel cable lock structure of the present invention.
Figure 3:
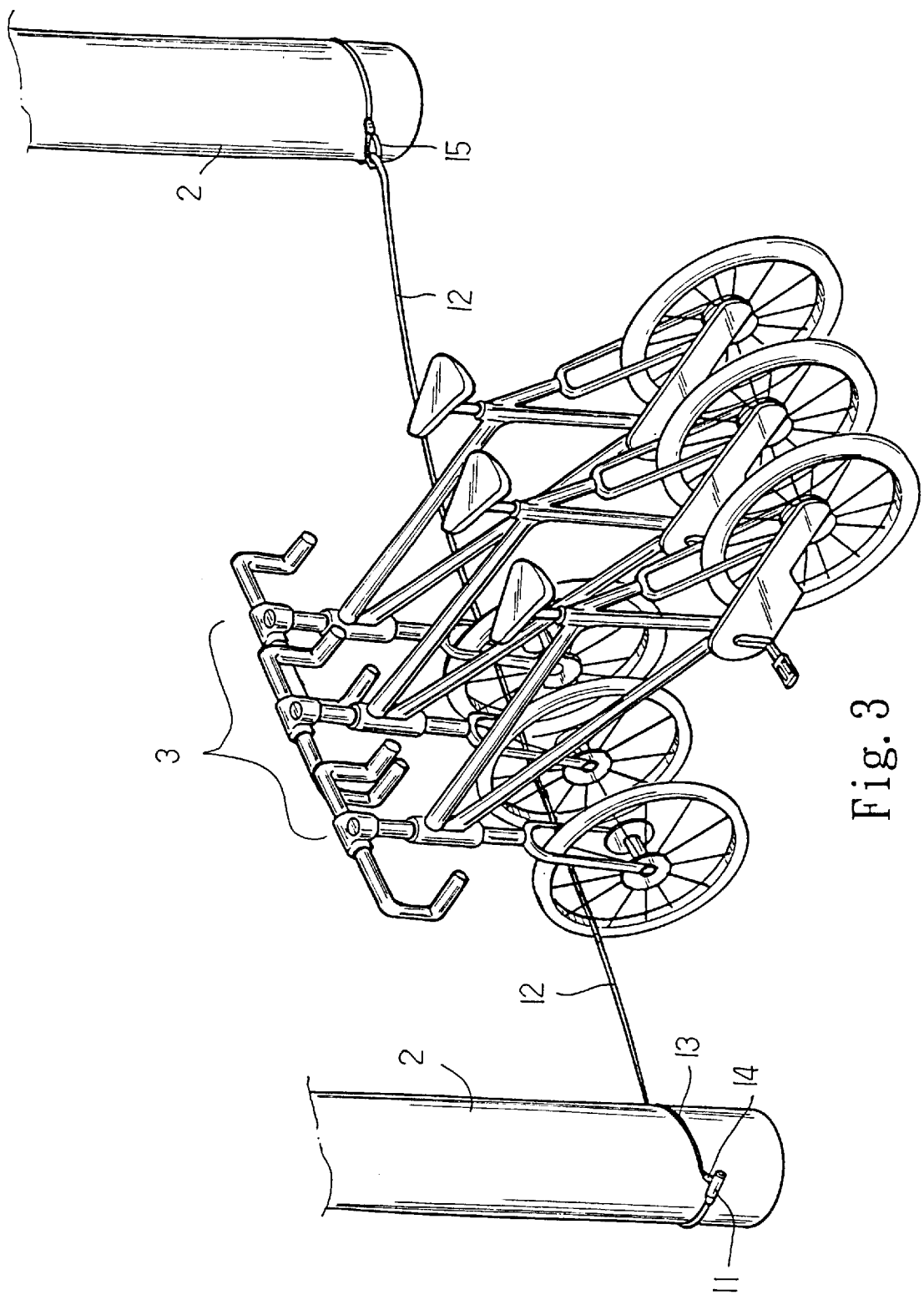
FIG. 3 shows another application of the steel cable lock structure of the present invention.

Please refer to FIGS. 1 to 3. The steel cable lock 1 of the present invention includes a steel cable 12 with a certain length. A lock body 11 is fixed at one end of the steel cable 12, while a fitting ring 15 is formed at the other end thereof. A movable sleeve member 13 is fitted on the steel cable 12. A subsidiary steel cable 131 extends from the sleeve member 13. A lock pin member 14 is disposed at a free end of the subsidiary steel cable 131. In the case that the article 3 (such as a motorcycle or a bicycle) to be locked is spaced from a fixed article 2 by a longer distance, the steel cable 12 can be first wound around the fixed article 2 and then the lock body 11 at one end and the movable sleeve member 13 as well as the lock pin member 14 are passed through the fitting ring 15 at the other end. Then the lock body 11 passing through the fitting ring 15 and the sleeve member 13 slidably fitted on the steel cable 12 are pulled and adjusted to the article 3 to be locked. The lock pin member 14, subsidiary steel cable 131 and the main steel cable 12 with the lock body 11 are wound around the article 3 and then the lock pin member 14 is plugged into the lock body 11 to achieve a locking effect. Alternatively, the fitting ring 15 of the steel cable 12 can be wound and tied on the fixed article 2 and then the steel cable 12 is passed through the fitting ring 15 and pulled to pass through at least one article 3. Then the lock body 11 at the other end of the steel cable 12 and the subsidiary steel cable 131 slidable along the steel cable 12 and the lock pin member 14 are wound and locked on another fixed article 2. Therefore, multiple articles 3 can be serially locked together. According to the above arrangement, it is unnecessary to wind the steel cable around the article 3 to be locked and the fixed article 2 by several loops and the same locking effect can be achieved. Therefore, the length of the steel cable is saved. The present invention is especially applicable to those situations that the article 3 to be locked is spaced from the fixed article 2 by a longer distance. In addition, by means of the movable subsidiary steel cable 131 and the lock pin member 14, the winding length of the steel cable can be adjusted to a maximum extend in accordance with the size of the article 3 so as to facilitate use of the steel cable lock.

The above embodiments are only used to illustrate the present invention, not intended to limit the scope thereof. Many modifications of the above embodiments can be made without departing from the spirit of the present invention.

What is claimed is:

1. A steel cable lock assembly comprising:
   a) a first elongated steel cable having a first end with a fitting ring thereon and a second end;
   b) a lock body mounted to the second end of the first steel cable, the lock body having a cylindrical configuration with a lateral lock receptacle;
   c) a sleeve member movably mounted on the first steel cable so as to be movable between the first and second ends of the first steel cable; and
   d) a second elongated steel cable extending from the sleeve member and having a distal end with a lock pin member thereon, the lock pin member being engagable with the lateral lock receptacle.

* * * * *